United States Patent [19]

Bickley et al.

[11] 4,230,973
[45] Oct. 28, 1980

[54] DC COUPLED, WIDE BAND WIDTH HIGH VOLTAGE MODULATOR

[75] Inventors: Robert H. Bickley, Scottsdale; Michael J. Dewey, Tempe, both of Ariz.

[73] Assignee: Motorola, Inc., Schaumburg, Ill.

[21] Appl. No.: 34,218

[22] Filed: Apr. 30, 1979

[51] Int. Cl.³ .............................................. H01J 29/52
[52] U.S. Cl. ...................................... 315/383; 315/30
[58] Field of Search ................... 315/30, 383; 358/243

[56] References Cited

U.S. PATENT DOCUMENTS 2,884,562   4/1959   Solow .................................. 315/383
3,403,291   9/1968   Lazarchick, Jr. et al. ............ 315/30

Primary Examiner—Theodore M. Blum
Attorney, Agent, or Firm—Eugene A. Parsons

[57] ABSTRACT

Apparatus for controlling the intensity of a display on a cathode ray tube wherein the control signals are DC through several megahertz and a control loop maintains the average value of the control signal on the grid of a cathode ray tube relatively constant. Low frequency and high frequency signals are applied to the tube through separate circuits which are coupled together to provide coincident high pass and low pass −3 db crossover points so that all control signals applied to the tube are substantially equal over the entire bandwidth.

13 Claims, 3 Drawing Figures

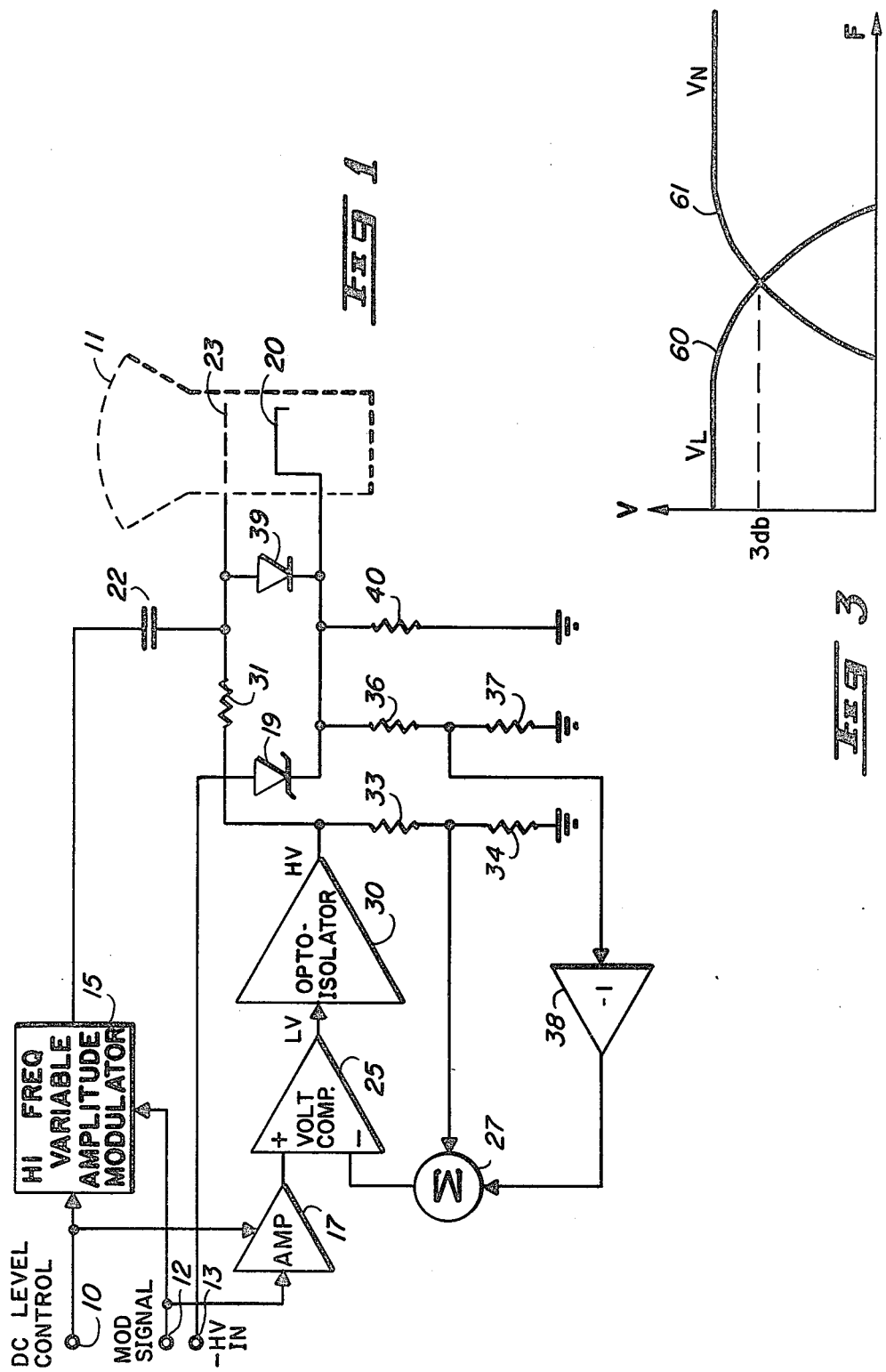

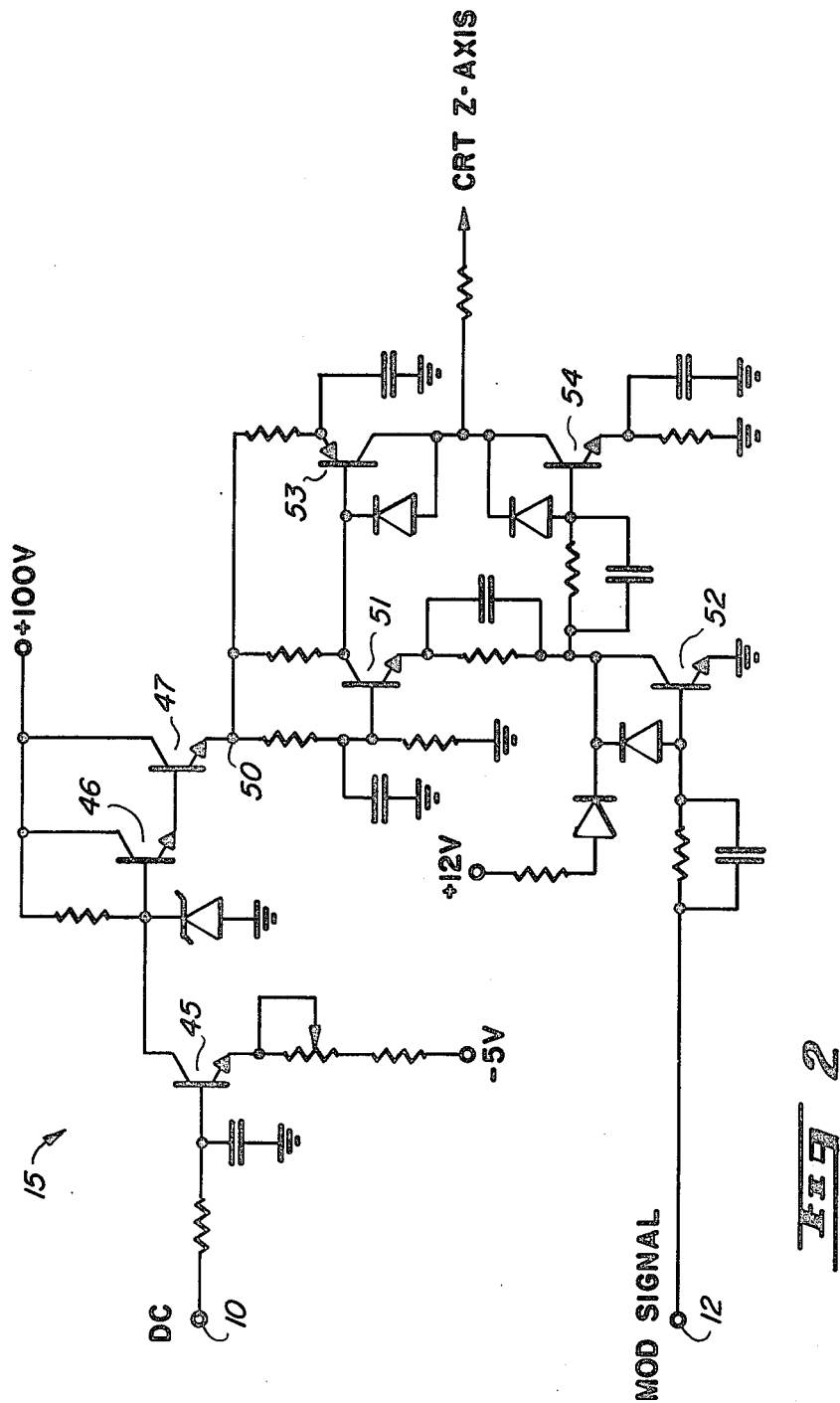

DC COUPLED, WIDE BAND WIDTH HIGH VOLTAGE MODULATOR

BACKGROUND OF THE INVENTION

In cathode ray tube displays, such as oscilloscopes and alphanumeric display devices, the intensity of the display on the face of the cathode ray tube is controlled by means of a manual control that supplies a DC intensity level signal to the cathode ray tube. A modulation signal, which may be for example pulses for producing alphanumeric displays, is also supplied to the tube for producing the display. In these types of displays it is necessary to supply control signals lying in a range from DC through several megahertz. Such a range is difficult to provide without producing glitches and/or breaks in the continuity, which means that all signals will not be applied equally. Further, relatively high voltages are required on the cathode ray tube to control the intensity and it is undesirable that these high voltages be available at the manual control.

In prior art devices a DC restoration circuit employing rectifier diodes, a tapped high voltage transformer and coupling capacitors were generally required to provide the function of supplying AC and DC intensity control signals to a cathode ray tube. AC control signals are generally supplied to the cathode of the tube and the DC and lower frequency control signals are applied to the grid with a rectifier diode connected therebetween. In such circuits it is difficult to provide wide bandwidth operation along with the required response at all frequencies so that no glitches appear in the bandwidth. Further, the transformer supplies a large AC voltage and in turn generates a large amount of noise and interference which is detrimental to nearby noise-sensitive circuits.

SUMMARY OF THE INVENTION

The present invention pertains to a modulator for controlling the intensity of a display on a cathode ray tube including first and second circuits for supplying high frequency and low frequency components of a control signal, respectively, to a cathode ray tube and means common to both circuits for coupling the circuits so that all components from DC through a relatively high frequency are applied substantially equally to the cathode ray tube. Further, the second or low frequency, circuit is constructed with means for sensing the voltage applied to the cathode ray tube and a control loop for maintaining the average voltage applied to the cathode ray tube approximately constant. An optical isolator amplifier is included in the loop to isolate the high voltage at the cathode ray tube from the low voltage or control portion of the system. A similar optical isolator control loop may also be used in the focus circuitry.

It is an object of the present invention to provide new and improved DC coupled, wide bandwidth high voltage modulator means for controlling the intensity of a display on a cathode ray tube.

It is a further object of the present invention to provide new and improved modulator means for applying DC through relatively high frequency control signals to a cathode ray tube in a substantially uniform manner.

It is a further object of the invention to provide an optical isolator control loop for use in high voltage circuits, such as intensity and focus circuits, associated with visual displays and the like.

It is a further object of the present invention to provide a high voltage modulator for controlling the intensity of a display on a cathode ray tube, which high voltage is isolated from the control of the system.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a block diagram of a DC coupled, wide bandwidth, high voltage modulator embodying the present invention;

FIG. 2 is a schematic diagram of a portion of the block diagram of FIG. 1; and

FIG. 3 is a representative waveform of the frequency bandpass of the circuitry of FIG. 1.

DESCRIPTION OF THE PREFERRED EMBODIMENT

Referring specifically to FIG. 1, the number 10 designates an input terminal adapted to receive a DC level control signal thereon. The level control signal is generated by a manually controlled potentiometer or the like (not shown) and sets the level of intensity of a display on a cathode ray tube 11. A second input terminal 12 is adapted to receive a modulation signal such as, for example, pulses and spaces for alphanumeric displays, etc. A third input terminal 13 is adapted to receive a negative high voltage input such as, for example, minus 2000 volts. Since the sources of these various inputs do not form a portion of this invention and are generally well known to those skilled in the art, the sources are not shown or explained herein.

The DC signal available at the input terminal 10 is applied to an input of a high frequency variable amplitude modulator 15, the operation of which will be explained in more detail in conjunction with FIG. 2. The DC level control signal is also applied to an input of a low frequency modulation amplifier 17. The modulation signal on the input terminal 12 is applied to second inputs of the modultor 15 and the amplifier 17. The negative high voltage available at the input terminal 13 is applied through a zener diode 19 to the cathode 20 of the CRT 11. While the terminal 13 with the negative high voltage is illustrated adjacent the other inputs, it will be understood by those skilled in the art that the negative high voltage supply and its connection to the cathode 20 of the CRT 11 is isolated from any external contact by an operator or the like and the present illustration is simply for convenience.

The output of the modulator 15 is applied through a high voltage coupling capacitor 22 to the grid 23 of the CRT 11. The output of the amplifier 17 is applied to the positive, or noninverting, input of a voltage comparator 25. A second input to the comparator 25 is received from an output of a summing circuit 27. The output of the comparator 25 is applied to a low voltage input of an optical isolator amplifier 30. The amplifier 30 may be, for example, a commercially available 4N25 circuit, which includes a gallium arsenide LED optically coupled to a silicon phototransistor. The high voltage output of the amplifier 30 is connected to the grid 23 of the CRT 11 through a resistor 31. The output of the amplifier 30 is also connected through a resistive divider, including series connected resistors 33 and 34, to ground. The series connected resistors 33 and 34 are in a ratio such that a relatively low representative portion of the voltage on the grid 23 is available at the junction of the resistors 33 and 34. The junction of the resistors 33 and 34 is connected to one input of the summing device 27. In a similar fashion a second resistive divider, including series connected resistors 36 and 37, is connected between the cathode 20 of the CRT 11 and ground. The resistors 36 and 37 are in a ratio such that a relatively low representative portion of the voltage available at the cathode 20 of the CRT 11 is available at the junction of the resistors 36 and 37. The junction of the resistors 36 and 37 is connected through an inverting amplifier 38 to a second input of summing device 27. Therefore, the output of the summing device 27 is proportional to the voltage on the cathode 20 minus the voltage on the grid 23. A grid protection diode 39 is connected between the grid 23 and the cathode 20 of the CRT 11 and a bias resistor 40 is connected from the cathode 20 of the CRT 11 to ground.

A schematic diagram of the modulator 15 is illustrated in FIG. 2. While a specific circuit is illustrated, it should be understood that other circuits might be utilized if desired. Three transistors 45, 46, and 47 operate as a variable voltage supply for a terminal 50. The DC level control terminal 10 is connected to the base of the transistor 45 and controls the amount of voltage applied to the terminal 50. The intensity of the pattern of the CRT 11 is directly proportional to the DC applied to the terminal 10 and the voltage available at the terminal 50 is inversely proportional to the voltage applied to the terminal 10. Four transistors 51, 52, 53 and 54 are connected between the terminal 50 and ground to form a saturated amplifier or, essentially, an on/off switch. This saturated amplifier is controlled by the modulation signal applied to the input terminal 12. In the present embodiment, the DC voltage at the terminal 50 varies between approximately 0 and 70 volts and the modulation signal at the output of the modulator 15 varies between approximately 70 and 0 volts.

In the operation of the DC coupled, wide bandwidth, high voltage modulator disclosed, a DC level control signal is applied to the input terminal 10 to provide the desired intensity on patterns appearing at the face of the CRT 11. A modulation signal is applied to the input terminal 12, which modulation signal produces the desired pattern on the face of the CRT 11. As described in conjunction with FIG. 2, the DC signal is used to control the amplitude of the high frequency signals applied from the modulator 15 through the capacitor 22 to the grid 23 of the CRT 11. The DC signal and low frequency components of the modulation signal are applied through the amplifier 17 to the comparator 25 in the low frequency control loop. The low frequency, low voltage signals from the comparator 25 are utilized to control a high voltage in the optical isolator amplifier 30 to produce high voltage signals at the output thereof. These high voltage signals are applied through the resistor 31 to the grid 23 of the CRT 11. The voltage on the cathode 20 of the CRT 11 is sensed by the resistive divider 36-37 and a low voltage representative portion of the signal is supplied through the inverting amplifier 38 to the summing device 27. The voltage on the grid 23 of the CRT 11 is sensed by the resistive divider 33-34 and a low voltage representative portion thereof is applied to the summing device 27. The summing device 27 sums the two representative low voltage signals and supplies a signal representative of the voltage on the cathode 20 minus the voltage on the grid 23 to the comparator 25. The comparator 25 compares this representative voltage to the signal supplied from the amplifier 17 and supplies an output signal which controls the voltage applied to the grid 23 so as to maintain the average voltage between the grid and the cathode approximately constant. Thus, the intensity of the pattern on the face of the CRT 11 is maintained at the desired level regardless of the pattern appearing on the face of the CRT 11. It should be noted that a similar optical isolator, control loop circuit may be used in other controlled high voltage circuits, such as for example the focus circuit.

To provide the desired bandwidth for the circuitry, the high frequency components of the control signals are applied to the grid 23 through the capacitor 22 and the DC/low frequency components of the signals are applied to the grid 23 through the resistor 31. So that signals in the entire bandwidth are applied substantially equally to the grid 23, it is essential that the high and low frequency paths or circuits cross over at the same frequency to prevent glitches or breaks in the pass band of the circuit. The networks comprised of resistor 31, capacitor 22 and their associated source and load impedances form a crossover network assuring that the low pass and high pass corner frequencies, or $-3$ db frequency response points, are identical. Referring to FIG. 3, the pass band of the low frequency circuitry is designated 60 and the pass band of the high frequency circuitry is designated 61. It should be noted that the crossover point of 60 and 61 is approximately 3 db down which provides a complete response having a substantially smooth curve over the entire pass band. In the present embodiment the optical isolator amplifier 30 has a relatively broad bandwidth so that the crossover point which must be substantially below the rolloff of amplifier 30 is at approximately one kilohertz. It will be understood by those skilled in the art that the crossover point might appear at substantially any frequency and is dependent upon the specific components utilized in the high and low frequency circuits. In the present circuit, the capacitor 22 and the modulator 15 operate as a low impedance to high frequencies in the low frequency circuit and resistors 31, 33, 34 and the low output impedance of amplifier 30 provide an effective ground for the high frequency circuit. Thus, the capacitor 22 and resistor 31 are the common frequency response determining components for both the high and low frequency circuits and insure that the low pass and high pass corner frequencies will be identical.

Thus, a DC coupled, wide bandwidth, high voltage modulator is disclosed with a substantially smooth pass band from DC through several megahertz and circuitry for maintaining the intensity of the display substantially constant regardless of the pattern. Also, the high voltage of the circuitry is isolated from the controls so that special protective components are not required. Further, the crossover network and its associated circuitry eliminates the need for a transformer which supplies a large AC voltage and in turn, generates a large amount of noise and interference which is detrimental to nearby noise sensitive circuits. It should be understood that the DC and low frequency control loop may be used by itself to control high voltages for use in a CRT circuit where wide bandwidth is not required such as the CRT focus control.

While we have shown and described a specific embodiment of this invention, further modifications and improvement will occur to those skilled in the art. We desire it to be understood, therefore, that this invention is not limited to the particular form shown and we intend in the appended claims to cover all modifications which do not depart from the spirit and scope of this invention.

We claim:

1. A modulator for controlling the intensity of a display on a cathode ray tube by means of signals including a DC intensity level component and AC components, said modulator comprising:
   (a) monitoring means associated with the cathode ray tube for sensing control voltages applied to the cathode ray tube;
   (b) optical isolator means having a relatively low voltage, control input signal and a relatively high voltage control output signal coupled to the cathode ray tube for producing a desired intensity; and
   (c) a control loop including comparator means coupled to said monitoring means and said optical isolator means for comparing the DC intensity level component and relatively low frequency AC components to the sensed control voltage applied to the cathode ray tube and supplying the control input signal to said optical isolator means maintaining the intensity of the cathode ray tube at the desired level.

2. A modulator as claimed in claim 1 wherein the monitoring means includes dividing circuitry for providing a relatively low representative portion of the control signal applied to the cthode ray tube.

3. A modulator as claimed in claim 1 having in addition an electrical path for applying relatively high frequency AC components to the cathode ray tube, the control loop and said electrical paths being coupled together so that at the CRT grid, the upper 3 db frequency of the DC path from the control loop and the lower 3 db frequency of the AC path from the modulator are substantially equal.

4. A modulator as claimed in claim 1 wherein the electrical path includes a capacitor connected to couple high frequency components in the electrical path to the cathode ray tube and to couple high frequency components in the control loop to ground.

5. A modulator for controlling the intensity of a display on a cathode ray tube by means of signals including a DC intensity level component and AC components, said modulator comprising:
   (a) a high frequency circuit for coupling the AC components to the cathode ray tube;
   (b) a DC/low frequency circuit for coupling the DC intensity level component to the cathode ray tube; and
   (c) apparatus common to both circuits and coupling said circuits so that the corner frequency in the DC/low frequency circuit and the corner frequency in the high frequency circuit are substantially equal.

6. A modulator as claimed in claim 5 wherein the DC/low frequency circuit includes a control loop with comparison means for comparing intensity voltages applied to the cathode ray tube to the control signals.

7. A modulator as claimed in claim 5 wherein the common apparatus is constructed so that the high frequency path and low frequency path components are equal at a point at which the low frequency and high frequency components are down by approximately 3 db.

8. A modulator as claimed in claim 5 wherein the high frequency circuit and the DC/low frequency circuit are connected to a grid of the cathode ray tube.

9. A modulator as claimed in claim 8 wherein the common apparatus include a capacitor connecting the high frequency circuit to the grid and a resistor connecting the DC/low frequency circuit to the grid.

10. A modulator as claimed in claim 9 including in addition means for monitoring the voltage between the cathode and the grid of the cathode ray tube and means associated with the DC/low frequency circuit for maintaining the average value of the voltage approximately constant.

11. A modulator as claimed in claim 10 wherein the associated means includes a control loop with optical isolator means therein for isolating relatively low input voltages from relatively high output voltages.

12. A modulator as claimed in claim 10 wherein the monitoring means includes resistive dividers connected to the grid and cathode of the cathode ray tube for providing relatively low output voltages representative of voltages on the grid and cathode respectively.

13. Apparatus for controlling the high voltage on a cathode ray tube by means of signals including a DC level component, said apparatus comprising:
   (a) monitoring means associated with the cathode ray tube for sensing control voltages applied to the cathode ray tube;
   (b) optical isolator means having a relatively low voltage, control input signal and a relatively high voltage control output signal coupled to the cathode ray tube for producing a desired high voltage; and
   (c) a control loop including comparator means coupled to said monitoring means and said optical isolator means for comparing the DC level component to the sensed control voltage applied to the cathode ray tube and supplying the control input signal to said optical isolator means maintaining the high voltage applied to the cathode ray tube at the desired level.

* * * * *